Patented Nov. 21, 1950

2,531,360

UNITED STATES PATENT OFFICE 2,531,360

FERTILIZER BLOCK FOR FERTILIZING PLANT LIFE IN FISHING WATERS

Arthur Herbert Martin, Montreal, Quebec, Canada, assignor to Canadian Industries Limited, Montreal, Quebec, Canada, a corporation of Canada No Drawing. Application February 26, 1947, Serial No. 731,053. In Canada September 27, 1946

3 Claims. (Cl. 71—64)

This invention relates to fertilization of fishing waters and more particularly to an improved method of fertilizing such waters using the fertilizer in block form.

The basic natural food for fish is microscopic plant and animal life called "plankton" which live in the surface area of water. Phytoplankton, which is the microscopic plant life, feeds from the dissolved solids of the water and gets energy from the sun. It is consumed by the microscopic animal life called zoo-plankton or, when dead, settles to the bottom and feeds the fauna there living. This bottom fauna, which comprises insects, snails and aquatic earthworms, is eaten by carnivorous fish. The zoo-plankton is consumed by forage fish and fingerlings of all species which, in turn, are consumed by the carnivorous fish. However, when fingerlings are scarce, carnivorous fish survive on zoo plankton.

From this food cycle, it will be seen that phytoplankton and, consequently, the size and number of fish in any given body of water are primarily dependent on the dissolved materials brought by the water draining from the surrounding land surface. Accordingly, ponds receiving draining water from well fertilized fields support a high fish population, while those receiving water from areas of low fertility produce fewer and smaller fish.

Fertilization of fishing waters has been known and practised for some time, the purpose being to increase the growth of phytoplankton, thus improving the fish population. Fertilizers have heretofore been used in fine powder or granular form, the material being carried in sacks to the feeding places and then applied by being scattered over the water.

Although powdered or granular fertilizers produce beneficial results, they are subject to numerous disadvantages. For instance, in certain types of streams, the rate of water flow is such that much of the powdered material is wasted by being drawn away. Another disadvantage is the inconvenience attendant on handling the loose fertilizer since it is difficult to transport bags of powdered material through the bush surrounding most fishing waters. Likewise, because of injury to the bags caused by snow and ice, it is impractical to ship the material to northern waters during the winter to leave it at the side of a lake ready for use as soon as the spring thaws occur.

It is an object of this invention to overcome the foregoing disadvantages and to provide an improved process for the fertilization of fishing waters. Other objects and advantages of this invention will be apparent from the following specification in which the details and preferred embodiments of the invention are described.

According to the present invention, fertilization of fishing waters is accomplished by the means of fertilizers in block form. By choice of appropriate constituents in suitable proportions, which constitute possessing fertilizing properties and derived from whatever sources may be selected as appropriate from the standpoints of availability, economy and efficiency, and by use of sufficiently high pressures, fertilizer blocks can be obtained which are very easy to handle because of their size and their mechanical strength, and which dissolve or disintegrate at a suitable rate when placed in streams or lakes.

Any powdered or granular fertilizer heretofore used may be compressed in block form by the usual methods, for example by use of the Carver press. Amongst the materials preferred are mixtures of ammonium phosphate, ammonium nitrate, cyanamide, muriate of potash and dolomitic limestone. Some of these can be supplemented or substituted by potassium nitrate, potassium phosphate or other chemical compounds containing, in concentrated form, one or more of the plant food substances: nitrogen, phosphorous, potassium, calcium, magnesium, sulphur, and, it may be, containing also what are known as the "rarer elements" such as boron, cobalt and manganese. Once moulded, the fertilizer blocks are transported to the fishing waters to be fertilized and then dropped into the water where they disintegrate to yield the desired beneficial effects.

Because they sink rapidly and disintegrate gradually, the fertilizer blocks thus prepared prevent the fertilizing materials from being drawn away by the water flow. Furthermore, because of their form and their good mechanical strength, they may be readily transported without any difficulty to the most remote and inaccessible areas. Square hand-hole recesses at both ends of the blocks further improve their handling.

It has been found that the mechanical strength of the blocks as well as the time for their complete disintegration in water depends on the constituents of the mixtures and on the pressure used in moulding the blocks. Pressures of from 7500 to 15000 pounds per square inch give mechanically strong blocks which withstand rough handling and dissolve readily in the streams irrespective of the size of the blocks. Pressures in excess of this value do not improve the strength of the blocks nor lengthen the disintegration period. In the case of large blocks, such as those of 50 pounds weight, omission of cyanamide from the mixture shortens the time for complete disintegration from 115–125 hours to less than 24 hours, but results in a diminution of the mechanical strength of the blocks, making them slightly crumbly and dusty to handle. Cyanamide thus stands as a binding substance for the blocks.

The following examples, in which the parts are by weight, serve to illustrate the above statements.

Example I

A fertilizer mixture, hereafter called Mixture I, was prepared with 100 parts of ammonium phosphate, 35 parts of ammonium nitrate, 5 parts of cyanamide, 40 parts of muriate of potash and 20 parts of granular dolomitic limestone. From this mixture, four 100 gram blocks were produced by pressing for 2 minutes in a 2¼ inch diameter circular mould at pressures of 7500, 10,000, 12,500 and 15,000 pounds per square inch, in the Carver press. The blocks so produced were firm and hard with a density of approximately 1.7 gr./cc. The rate of disintegration of the blocks was determined by placing them on a ¼ inch sand screen 3 inches under water in an 8 gallon bath through which water at 5° C. circulated at 2 gallons per hour. The time required for the blocks to disintegrate to a formless mass on the screen was measured, and found to be 8–12 hours for all the blocks.

Example II

A mixture, hereafter called Mixture II, was prepared with 100 parts of ammonium phosphate, 40 parts of ammonium nitrate, 40 parts of muriate of potash and 20 parts of granular dolomitic limestone. From this mixture, four 100 gram blocks were prepared as in Example I, all of them being firm and hard with a density of approximately 1.7 gr./cc. The rate of distintegration, determined as in Example I, was found to be 3–4 hours for all the blocks.

Example III

Three 50 pound blocks were prepared from Mixture I by pressing at 10,000, 15,000 and 20,000 pounds per square inch. These blocks were hard and smooth and received after shipment without cracks or breaks. They were placed on ¼ inch sand screens 4 inches above the bottom of individual tanks of 17 to 18 gallons capacity. Water was run into the bottom of the tanks at approximately 10 gallons per hour to give a complete change of water every 2 hours on the average. The top surface of the blocks were by this arrangement two inches under water. No appreciable eddies were formed in the tanks, and it is presumed that the disintegration rates thus obtained are roughly those to be expected when blocks are placed on a hard gravel bottom in a body of nearly still water. The disintegration times thus found were as follows:

| Moulding pressure | Time for complete disintegration |
|---|---|
| P. s. i. | Hours |
| 10,000 | 140–150 |
| 15,000 | 115–125 |
| 20,000 | 115–125 |

Example IV

Three 50 pound blocks were prepared from Mixture II as in Example III. The blocks thus produced were slightly crumbly and dusty to handle and received after shipment with cracks running through them. The times for disintegration of the blocks were determined as in Example III and found to be as follows:

| Moulding pressure | Time for complete disintegration |
|---|---|
| P. s. i. | |
| 10,000 | less than 19 hours. |
| 15,000 | less than 24 hours (half gone at 6 hours). |
| 20,000 | less than 24 hours (half gone at 6 hours). |

Having thus described my invention what I claim is:

1. A process for the production of a coherent solid fertilizer block which consists in subjecting a mixture of 100 parts of ammonium phosphate, 35 parts of ammonium nitrate, 40 parts of muriate of potash and 20 parts of granular dolomitic limestone intimately admixed with 5 parts of cyanamide as a binder to a pressure of about 15,000 lbs. per square inch.

2. The fertilizer block produced by the process of claim 1.

3. A fifty-pound fertilizer block produced by the process of claim 1.

ARTHUR HERBERT MARTIN.

REFERENCES CITED

The following references are of record in the file of this patent:

UNITED STATES PATENTS

| Number | Name | Date |
|---|---|---|
| 1,747,804 | Travers | Feb. 18, 1930 |
| 1,947,971 | Cox | Feb. 20, 1934 |
| 1,988,307 | Fay | Jan. 15, 1935 |
| 2,019,824 | Liehr | Nov. 5, 1935 |

FOREIGN PATENTS

| Number | Country | Date |
|---|---|---|
| 21,143 | Great Britain | A. D. 1894 |
| 30,683 | Great Britain | A. D. 1897 |
| 13,504 | Great Britain | A. D. 1911 |

OTHER REFERENCES

Collins: "Commercial Fertilizers," Fourth ed. (1947) the Blakiston Co., Phila. Pa., pages 412, 473, 474, and 492.

Sauchelli: "Manual on Fertilizer Manufacture," Davison Chem. Co., Balto., Md. (1946).